T. P. Allen.
Feed-Cutter.
No. 75508.  Patented Mar. 17, 1868
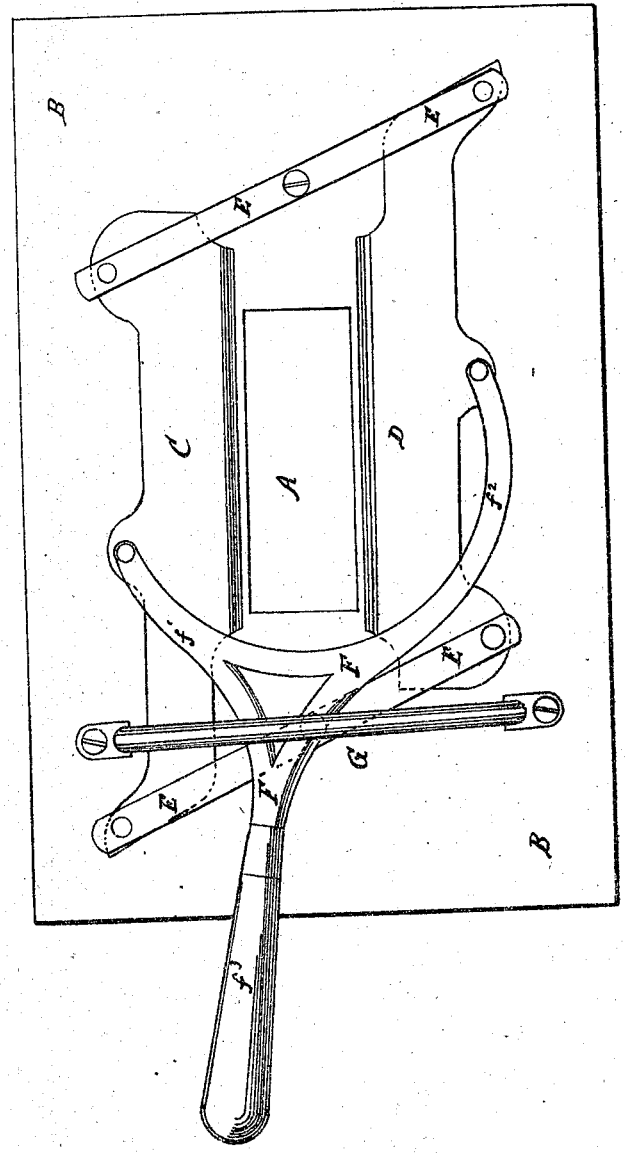
Witnesses.
H. C. Ashkettle
J. A. Fraser
Inventor.
Truman P. Allen
per Munn & Co
attorneys.

United States Patent Office.

TRUMAN P. ALLEN, OF GOWANDA, NEW YORK.

Letters Patent No. 75,508, dated March 17, 1868.

IMPROVEMENT IN FEED-CUTTER.

*The Schedule referred to in these Letters Patent and making part of the same.*

TO ALL WHOM IT MAY CONCERN:

Be it known that I, TRUMAN P. ALLEN, of Gowanda, in the county of Cattaraugus, and State of New York, have invented a new and improved Feed-Cutter; and I do hereby declare that the following is a full, clear, and exact description thereof, which will enable others skilled in the art to make and use the same, reference being had to the accompanying drawing, forming part of this specification.

The figure is a front view of a feed-cutter illustrating my invention.

My invention has for its object to furnish an improved feed-cutter, simple in construction and effective in operation, doing its work with a less expenditure of power for the amount of work done than other machines now in common use; and it consists in so arranging two knives as to obtain a drawing stroke with each knife, in applying the power directly to the knives, and in the combination of the knives, connecting-bars, and operating-lever with each other, the whole being constructed and arranged as hereinafter more fully described.

A represents the mouth of the cutter-box, and B represents the front-end board or framework of the same. C and D are the knives, the ends of which are pivoted to the ends of the two pivoted connecting-bars E. The bars E, at their middle points, are pivoted to the framework at the front of the cutter, and the bars E, and knives C and D, should be so arranged that the edges of the knives may meet a little quicker at one end than at the other, so that a drawing stroke may be made by both knives at the same time. The ends of the bars E may or may not be slotted for the reception of the ends of the knives, as may be desired. If desired, guards may be attached to the framework B at the front of the box, at both sides of the mouth A, so as to keep the knives in proper position when moving up and down. These guides are not shown in the drawing. F is the operating-lever, the forward end of which is made branched, as shown in the drawing. The end of the branch $f^1$ is pivoted to one of the knives, as C, and the end of the other branch, $f^2$, is pivoted to the other knife. The other end, $f^3$, of the lever forms the handle by which the said lever is operated. By this construction and arrangement of the lever, knives, and connecting-bars, the pivoting point of each knife becomes the fulcrum of the lever with respect to the other knife, so that the knives are both moved towards each other by the application of the same power, the direct action of the power and the resistance combining to operate the knives. G is a guide-bar attached to the front of the cutter to keep the lever F in proper position while operating the knives.

Having thus described my invention, what I claim as new, and desire to secure by Letters Patent, is—

1. Arranging the two knives C and D, substantially as herein shown and described, so as to obtain a drawing stroke with each knife.

2. Applying the power directly to the knives, substantially as herein shown and described and for the purpose set forth.

3. The combination of the knives C and D, pivoted connecting-bars E, and branched operating-lever F with each other, substantially as herein shown and described and for the purpose set forth.

The above specification of my invention signed by me, this 27th day of December, 1867.

TRUMAN P. ALLEN.

Witnesses:
  HIRAM F. HERRICK,
  CHAS. W. SMITH.